(12) United States Patent
McLardy

(10) Patent No.: US 9,156,485 B1
(45) Date of Patent: Oct. 13, 2015

(54) LEVERAGE CART ASSEMBLY

(71) Applicant: Sandy I. McLardy, Ewing, NJ (US)

(72) Inventor: Sandy I. McLardy, Ewing, NJ (US)

( * ) Notice: Subject to any disclaimer, the term of this patent is extended or adjusted under 35 U.S.C. 154(b) by 0 days.

(21) Appl. No.: 13/934,211

(22) Filed: Jul. 2, 2013

Related U.S. Application Data

(60) Provisional application No. 61/690,610, filed on Jul. 2, 2012.

(51) Int. Cl.
*B62B 1/12* (2006.01)

(52) U.S. Cl.
CPC ........................................ *B62B 1/12* (2013.01)

(58) Field of Classification Search
CPC .............. B62B 1/12; B62B 1/16; B62B 1/14; B62B 1/008
USPC ........ 280/47.131, 47.17, 47.18, 47.19, 47.24, 280/47.27, 47.28, 47.29, 63
See application file for complete search history.

(56) References Cited

U.S. PATENT DOCUMENTS

| | | | | | |
|---|---|---|---|---|---|
| 429,140 | A | * | 6/1890 | Mallory | 414/449 |
| 590,436 | A | * | 9/1897 | Marvel | 414/454 |
| 673,232 | A | * | 4/1901 | Bechtel | 280/47.24 |
| 679,279 | A | * | 7/1901 | Fairchild | 414/456 |
| 1,150,539 | A | * | 8/1915 | Ross | 280/47.29 |
| 1,429,918 | A | * | 9/1922 | Allen | 280/47.27 |
| 1,431,861 | A | * | 10/1922 | Adams | 414/449 |
| 1,517,951 | A | * | 12/1924 | Cade | 280/47.27 |
| 2,766,063 | A | * | 10/1956 | Greeley | 298/2 |
| 2,800,337 | A | * | 7/1957 | Avril | 280/47.33 |
| 3,939,999 | A | * | 2/1976 | Nielson | 414/444 |
| 4,049,284 | A | * | 9/1977 | Capper | 280/47.18 |
| 5,256,025 | A | * | 10/1993 | Williamson | 414/490 |
| 5,993,134 | A | * | 11/1999 | Williamson | 414/490 |

* cited by examiner

*Primary Examiner* — John Walters
*Assistant Examiner* — Brian Swenson
(74) *Attorney, Agent, or Firm* — LaMorte & Associates, P.C.

(57) ABSTRACT

A leverage cart assembly is used to lift and move a load. The leverage cart assembly has a load plate that is coupled to a support framework. The load to be lifted is placed on the lift plate and is strapped to the support framework. A hand truck assemblage is provided that is used to raise and lower the load plate, the support framework, and the attached load. The hand truck assemblage includes a cart framework that is supported on wheels. At least one lift plate extends from the cart framework and engages the load plate with a hinged connection. As the hand truck assemblage is tilted, the lift arm inclines. This elevates the load plate and the load. However, due to the hinge connection, the orientation of the load plate relative the load remains constant as the load plate and load are lifted.

18 Claims, 5 Drawing Sheets

LEVERAGE CART ASSEMBLY

RELATED APPLICATIONS

This application claims priority of provisional Patent Application No. 61/690,610, filed Jul. 2, 2012.

BACKGROUND OF THE INVENTION

1. Field of the Invention

In general, the present invention relates to the structure of hand trucks and handcarts. More particularly, the present invention relates to hand trucks with adjustable frames that enable the hand truck to be converted into more than one configuration.

2. Prior Art Description

Hand trucks have many forms. However, the present invention relates to utility hand trucks of the type that are used by movers and package deliverymen to transport large and/or heavy objects. Such utility hand trucks typically have a flat protruding plate that can be slipped under a box or other heavy object. The plate is connected to a vertical framework. The vertical framework is supported by two wheels. The object to be lifted is typically strapped to the vertical framework. The vertical framework is then tilted backward out of the vertical plane. Leverage is transferred to the plate under the object and the object lifts off the ground. The weight of the object is now borne by the wheels of the hand truck. The object can therefore be moved by rolling the hand truck.

One of the largest drawbacks of a traditional hand truck is that the object being lifted by the hand truck must tilt with the framework of the hand truck in order for the weight of the object to be borne by the wheels of the hand truck. Not all heavy objects are convenient to tilt onto the framework of a hand track. For instance, large bulky objects, such as a piano cannot be safely balanced on a traditional hand truck. As a result, such objects must be lifted onto dollies and then moved using those dollies. This is a difficult, time consuming and labor intensive endeavor.

Once an item is strapped to a hand truck and tilted with the framework of the hand truck, it is the responsibility of the handler to balance the object above the wheels of the hand truck. If the center of gravity of the lifted object is not kept balanced over the wheels, the handler must compensate using manual force. If the object is tipped too far, the weight of the object can easily surpass the strength of the handler and both the object and hand truck could fall together.

A need therefore exists for an improved system that can be used to lift and move a heavy object without having to place that object on dollies. A need also exists for a system that could enable a single person to lift and move a large bulky object without assistance. These needs are met by the present invention as described and claimed below.

SUMMARY OF THE INVENTION

The present invention is a leverage cart assembly that can be used to lift and move a large bulky load. The leverage cart assembly has a load plate upon which a load can be placed. The load plate is affixed to a support framework. The support framework extends primarily in a first plane and the load plate extends forward from the first plane of the support framework.

The load to be lifted is placed on the lift plate and is strapped to the support framework. A hand truck assemblage is provided that is used to raise and lower the load plate, the support framework, and the attached load. The hand truck assemblage includes a cart framework that may be supported on wheels. At least one lift plate extends from the cart framework and engages the load plate with a hinged connection.

As the hand truck assemblage is tilted, the lift arm inclines. This elevates the load plate and the load. However, due to the hinge connection, the load plate and load can be elevated without having to be tilted to the angle of the hand truck assemblage. When fully raised, the weight of the load is borne by the wheels of the hand truck assemblage. The load can therefore be moved by rolling the hand truck assemblage on its wheels.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention leverage cart can be embodied in many ways, the embodiment illustrated shows a single embodiment of a leverage cart. This embodiment is selected in order to set forth one of the best modes contemplated for the invention. The illustrated embodiment, however, is merely exemplary and should not be considered a limitation when interpreting the scope of the appended claims.

Figure 1:
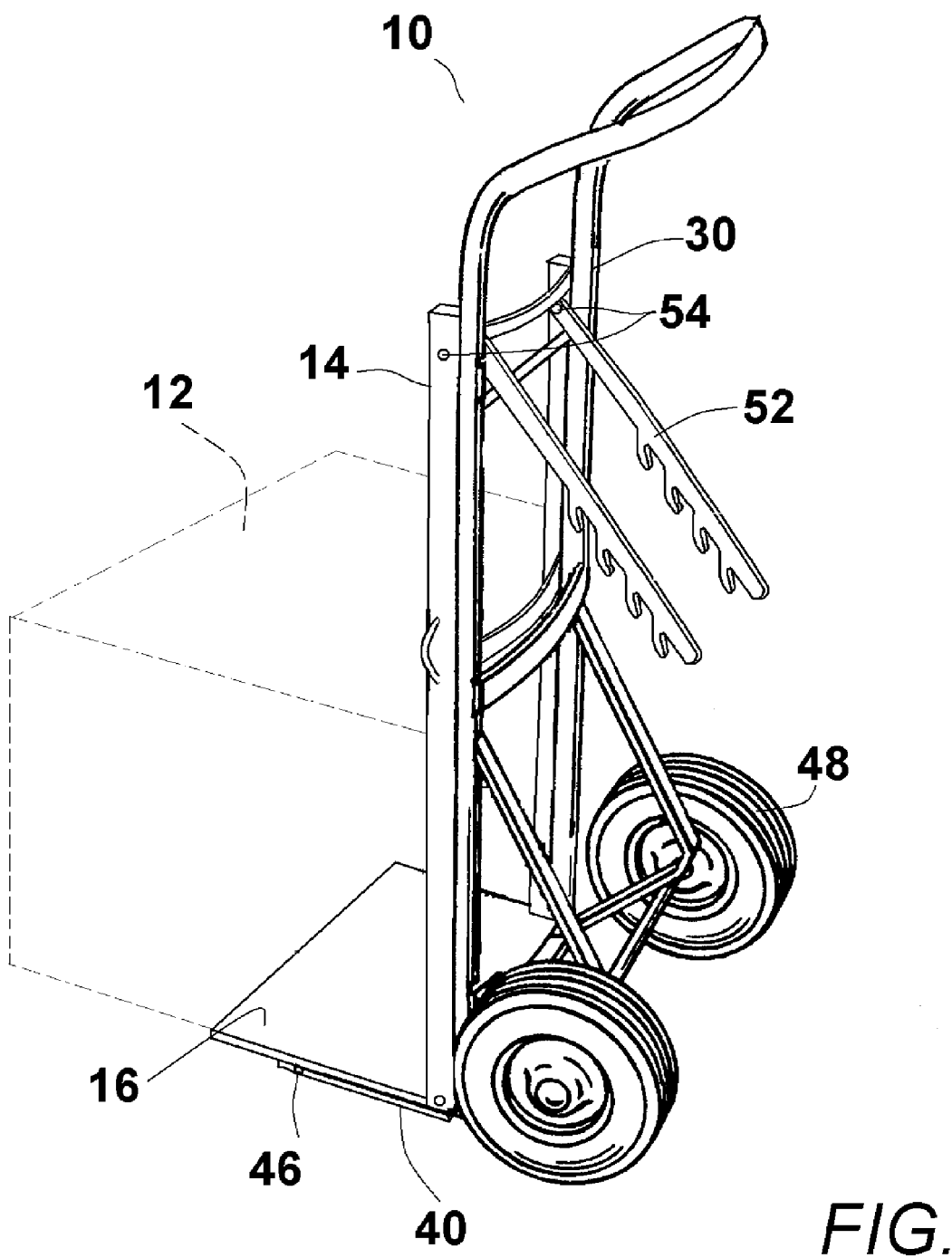
FIG. 1 is a perspective view of an exemplary embodiment of a leverage cart assembly.
Figure 2:
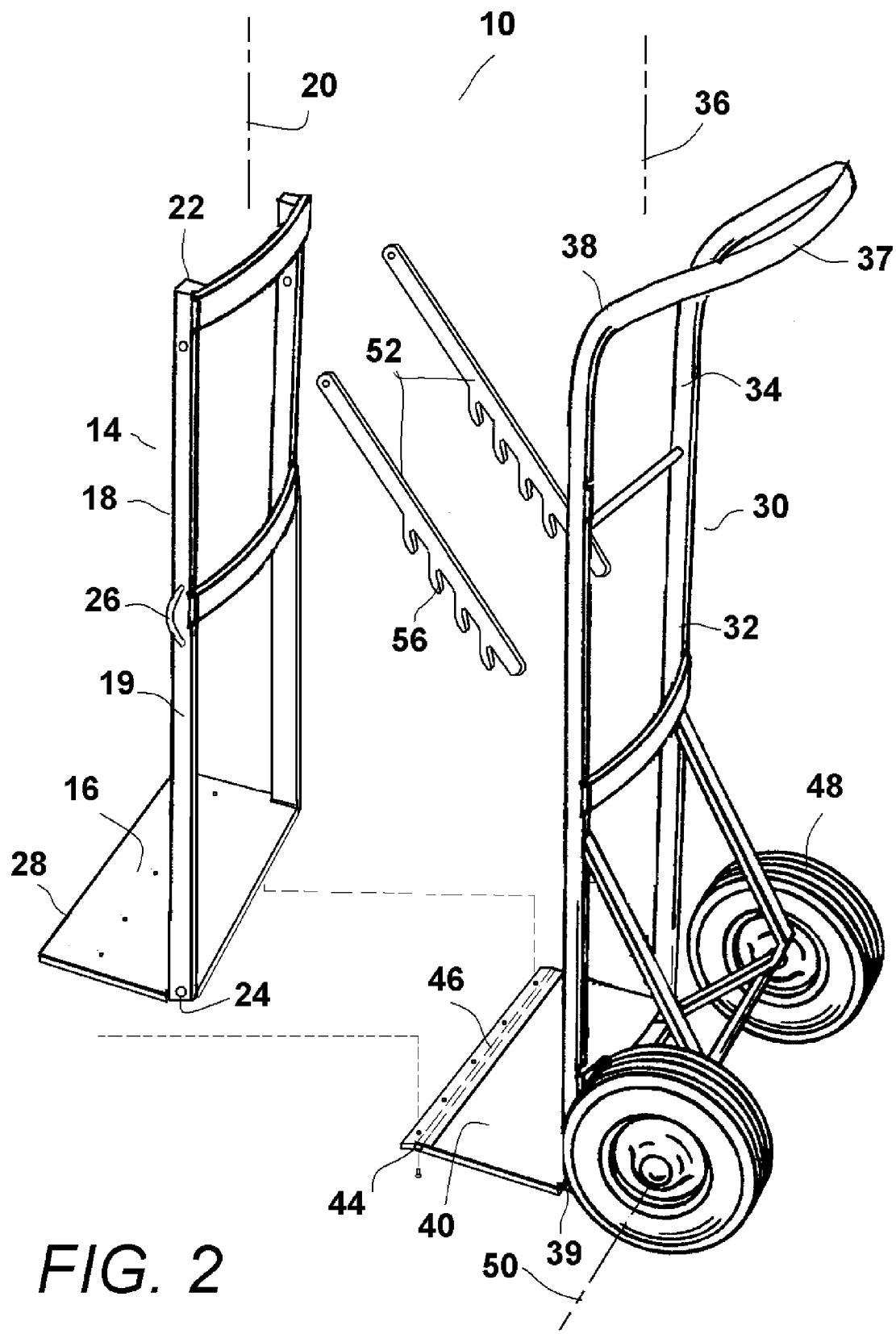
FIG. 2 is an exploded view of the embodiment of FIG. 1.

Referring to FIG. 1 in conjunction with FIG. 2, a leverage cart 10 is shown. The leverage cart 10 has a variable configuration that enables a load 12 to be lifted primarily in the vertical direction while the leverage cart 10 is tilted away from vertical. In this manner, the weight of the load 12 can be lifted and borne by the leverage cart 10 without the need to tilt the load 12.

The leverage cart 10 has a load support assemblage 14. The load support assemblage 14 is comprised of a flat load plate 16 and a load support framework 18. The load support framework 18 is made of interconnected tubular elements 19 that extend primarily in a first plane 20. In the shown illustrations of FIG. 1 and FIG. 2, the first plane 20 is vertically aligned.

The load support framework 18 terminates at the top with a first end 22 and at the bottom with an opposite second end 24. Strapping loops 26 may be affixed to the load support framework 18 at various positions along the length of the load support framework 18.

The flat load plate 16 is affixed to the load support framework 18 with a hinged joint 24. In the figures, the load plate 16 extends from the first plane 20 of the load support framework 18 at a perpendicular. However, this orientation can vary due to the hinged joint 24. The load plate 16 has a slightly tapered forward edge 28 to facilitate the insertion of the load plate 16 under a standing load 12.

The leverage cart 10 also has a hand truck assemblage 30. The hand truck assemblage 30 includes a cart framework 32. The cart framework 32 is made from interconnected tubular elements 34 and extend primarily in a second plane 36 between a top end 38 and a bottom end 39. Protruding handles 37 can be formed in the tubular elements 19 proximate the first end 22 to facilitate the manual grasping and manipulation of the cart framework 32.

The hand truck assemblage 30 has at least one lift arm 40. In the illustrated embodiment, the lift arm 40 is configured as a flat lift plate. However, the lift arm 40 need not be flat and can be configured as one or more cantilevered arms. Each lift arm 40 extends away from the second plane 36 of the cart framework 32 at a perpendicular. Each lift arm 40 terminates with a distal end 44. The distal end 44 of each lift arm 40 is attached to the bottom of the load plate 16 with a hinge connection 46.

The cart framework 32 is supported upon two wheels 48 that are attached to the cart framework 32 proximate the bottom end 39 of the cart framework 32. The wheels 48 rotate along an axle line 50. When the cart framework 32 is vertically oriented, the lift arm 40 touches the ground and the entire leverage cart 10 becomes freestanding. However, when the cart framework 32 is tilted by being manually manipulated away from the vertical, the entire leverage cart 10 becomes supported by the wheels 48.

A spacing bracket 52 is provided. The spacing bracket 52 is attached to the load support framework 18 at a hinged connection 54. The spacing bracket 52 also attaches to the cart framework 32. However, the points of attachment are variable. The spacing bracket 52 contains a plurality of hook structures 56. Different hook structures 56 engage the cart framework 32 depending upon the angle of inclination provided to the cart framework 32 relative to the load support framework 18.

Figure 3:
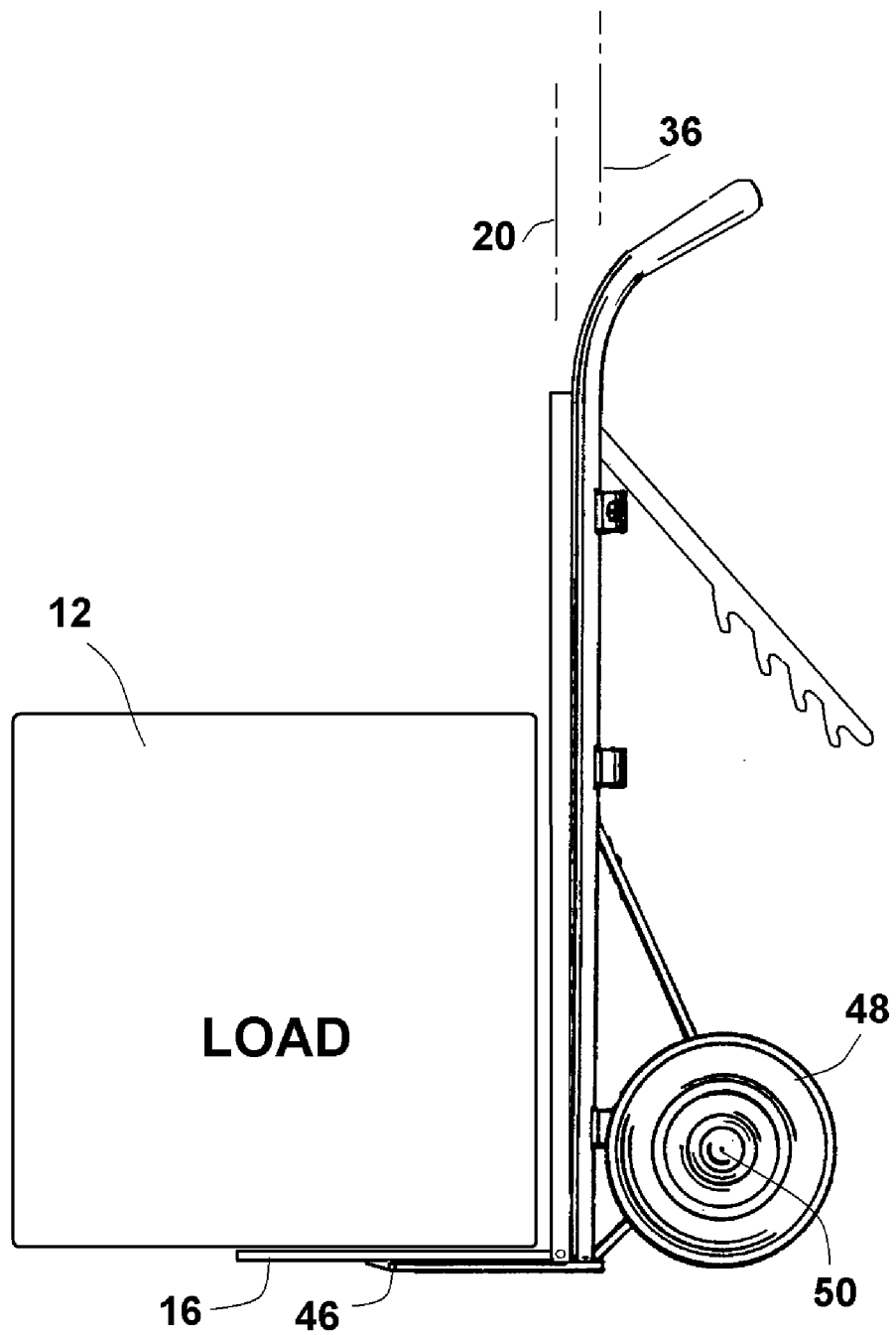
FIG. 3 is side view showing a portion of the exemplary leverage cart assembly engaging a load.
Figure 4:
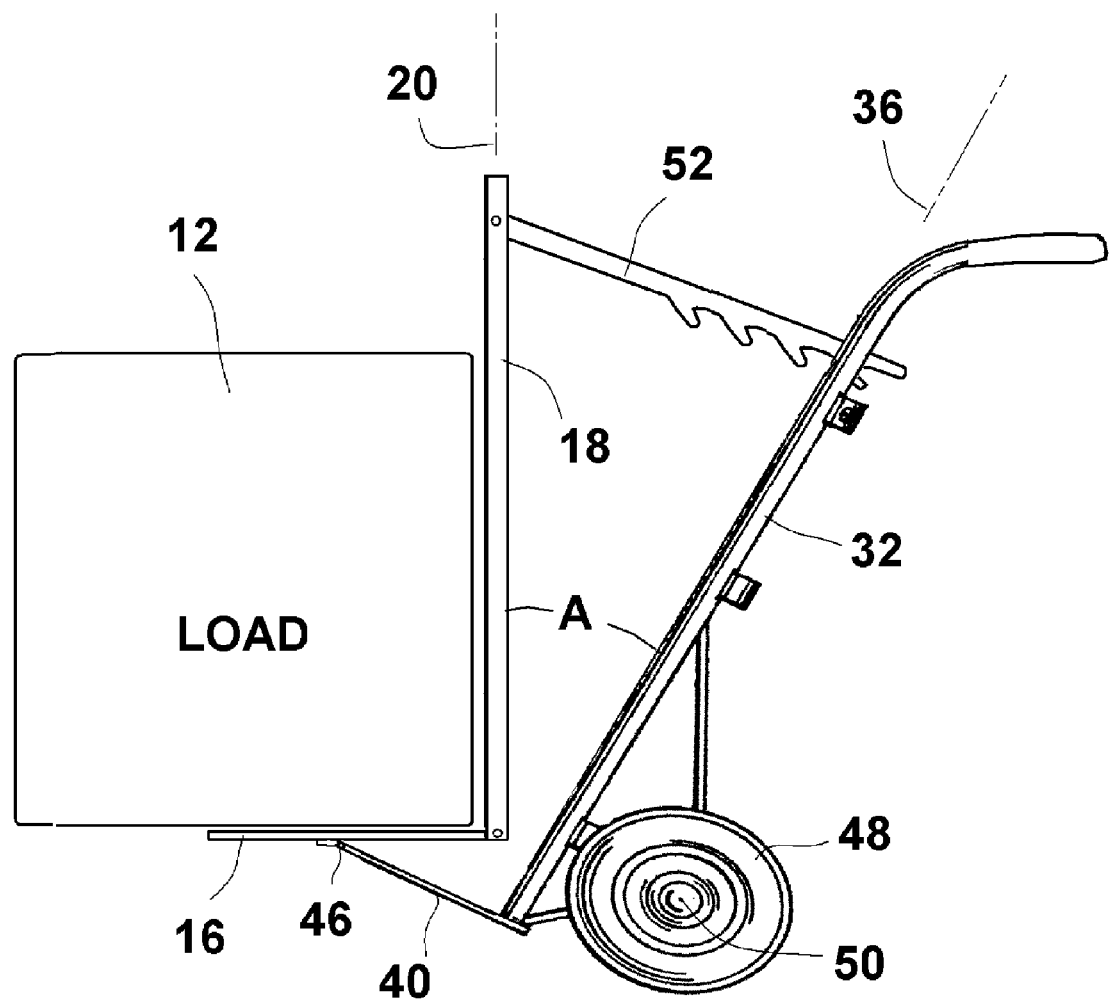
FIG. 4 is a side view showing a portion of the exemplary leverage cart assembly lifting a load.

Referring now to FIG. 3 and FIG. 4 in conjunction with both FIG. 1 and FIG. 2, it can be seen that the second plane 36 of the cart framework 32 and the first plane 20 of the load support framework 18 can be aligned with the vertical. When in this orientation, the load plate 16 can be placed under the load 12. The load 12 can then be strapped to the load support framework 18 using the strapping loops 26 on the load support framework 18. Once the load 12 is strapped in place, the cart framework 32 can then be manually grasped and tilted backward out of the vertical. As the cart framework 32 is tilted backward, it pivots about the axle line 50 of the wheels 48. As such, the lift arm 40 rotates upwardly. The lift arm 40 is attached to the bottom of the load plate 16 with a hinge connection 46. As the lift arm 40 slants upwardly, it raises the elevation of the load plate 16. However, the load plate 16 remains flush against the bottom of the load 12 and assumes the angle of the bottom of the load 12. Consequently, the elevation of the load plate 16 rises without changing its initial orientation relative to the load 12.

The load 12 rests upon the load plate 16. As the elevation of the load plate 16 increases, the elevation of the load 12 also increases. As such, the load 12 supported by the load plate 16 is lifted up vertically. The load plate 16 remains flush against the load 12. The load support framework 18 also remains strapped to the load 12. Consequently, there is no relative movements between the load 12, the load plate 16 and the load support framework 18. The height that the load 12 is lifted is proportional to the degree that the lift arm 40 is tilted. Consequently, the more the cart framework 32 is tilted, the more the lift arm 40 tilts, and the higher the load 12 is lifted. Once the cart framework 32 is tilted to a desired angle of inclination (A), the relative position between the cart framework 32 and the load support framework 18 can be secured by locking the spacing bracket 52 in place. Once the spacing bracket 52 is locked in place, the leverage cart 10 becomes a static leverage cart that can be manually pushed and pulled.

During movements of the leverage cart 10, the cart framework 32 is tilted but the load support framework 18 and the load 12 have a different orientation.

Figure 5:
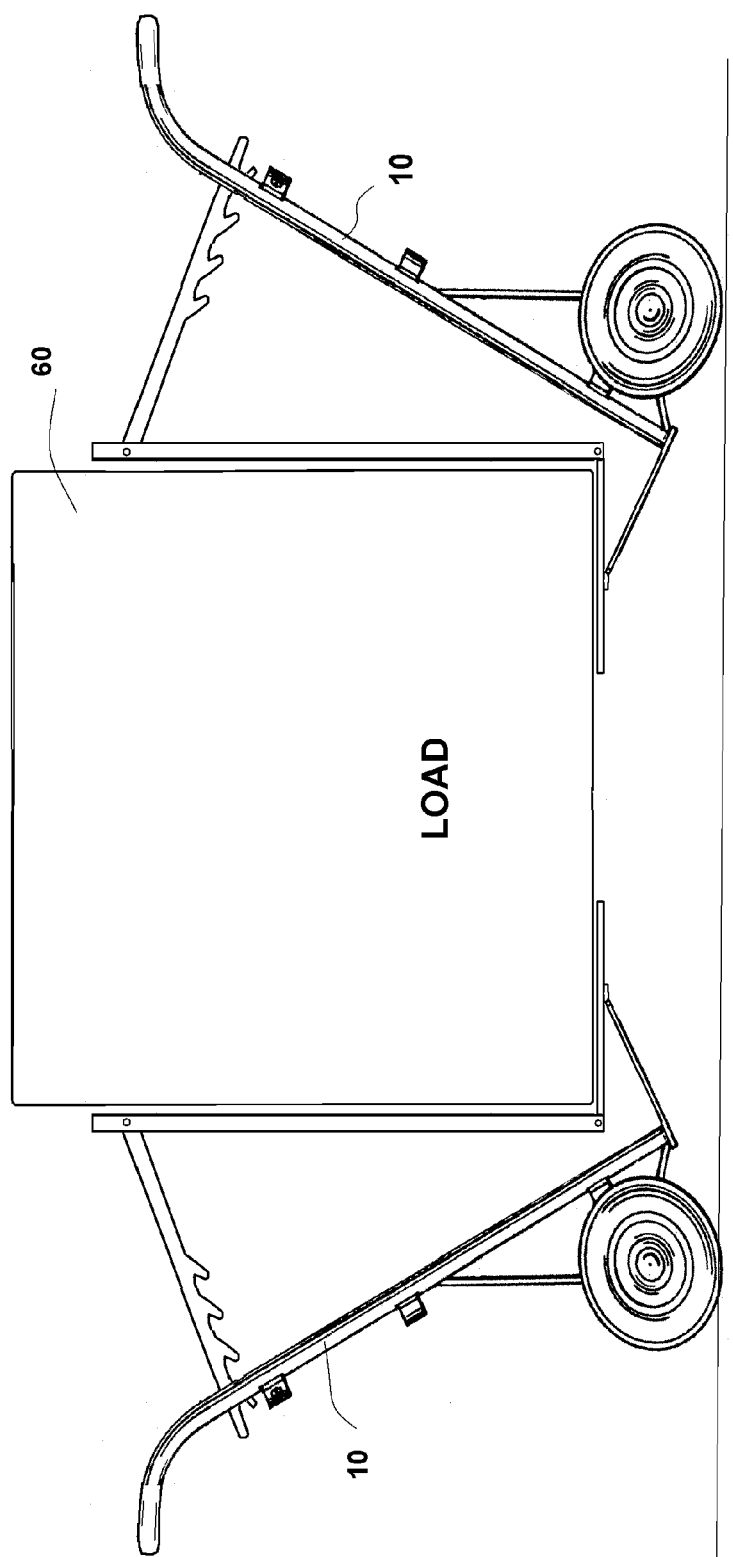
FIG. 5 is a front view showing a matched set of leverage carts being used to simultaneously lift a common load.

Referring to FIG. 5, it can be seen that the present invention leverage cart 10 can be used as part of a matched set in order to lift a heavy load 60 vertically into the air. Since each leverage cart 10 lifts loads vertically, without tilting, two leverage carts 10 can be used on opposite sides of the same load 60. Both leverage carts 10 can be strapped to the load 60 and used to lift the load 60 simultaneously. The use of multiple leverage carts 10 to lift the same load 60 from opposite sides of the load 60 cannot be achieved using prior art leverage carts. However, using the present invention leverage cart 10, the result is that the load 60 can be lifted vertically from any surface upon which the leverage cart 10 is utilized. Objects, such as fish tanks, bookshelves, cabinets, generators, and the like can therefore be lifted completely into the air without ever being significantly titled. Once the load is elevated into the air, it can be moved by a single person.

It will be understood that the embodiment of the present invention that is illustrated and described is merely exemplary and that a person skilled in the art can make many variations to that embodiment. For instance, the length and width of the leverage cart can be altered as a matter of design choice. Furthermore, features common to prior art leverage carts, such as retractable straps and wheel turning devices can also be used on the present invention leverage cart. All such embodiments are intended to be included within the scope of the present invention as defined by the claims.

What is claimed is:

1. A leverage cart assembly, comprising:
   a load plate upon which a load can rest;
   a support framework affixed to said load plate, wherein said support framework extends primarily in a first plane and said load plate extends from said support framework forward of said first plane;
   a cart framework that extends primarily in a second plane;
   wheels for supporting said cart framework;
   a lift arm having a flat top plate and a distal end, wherein said lift arm extends as a cantilever away from said cart framework at a perpendicular to said second plane;
   a hinge connection that connects said distal end of said lift arm to said load plate, wherein said load plate is free to pivot with said hinge joint about said distal end and wherein said load plate lays flat atop said flat top plate of said lift arm when said cart framework is upright and said secondary plane of said cart framework is vertical.

2. The assembly according to claim 1, further including an adjustable spacing bracket extending between said support framework and said cart framework for holding said support framework and said cart framework in one of a plurality of possible orientations.

3. The assembly according to claim 2, wherein said spacing bracket is connected to said support framework with a pivot connection.

4. The assembly according to claim 3, wherein said spacing bracket contains a plurality of spaced hook elements that can selectively engage said cart framework.

5. The assembly according to claim 1, wherein said load plate has a bottom surface and said hinge connection couples said lift arm to said bottom surface.

6. The assembly according to claim 1, wherein said load plate is parallel to said lift arm when said cart framework is upright and said second plane of said cart framework is parallel to said first plane of said support framework.

7. The assembly according to claim 6, wherein said lift arm tilts upwardly, when said cart framework is inclined, wherein said lift arm elevates said load plate.

8. The assembly according to claim 7, wherein said load plate is connected to said support framework with a hinged joint.

9. A leverage cart assembly, comprising:
a cart framework that extends in a primary plane;
wheels for supporting said cart framework;
a flat plate that extends from said cart framework at a perpendicular, wherein said flat plate terminates at a distal end;
a load plate having a top surface and a bottom surface, wherein said load plate lays flat atop said flat plate when said cart framework is upright and said primary plane of said cart framework is vertical;
a hinge connection disposed at said distal end of said flat plate, wherein said bottom surface of said load plate is affixed to said flat plate by said hinge connection, and wherein said hinge connection enables said load plate to remain horizontal while said flat plate inclines.

10. The assembly according to claim 9, further including a support framework that is coupled to said load plate, wherein said support framework and said load plate form an assemblage that is rotatable about said hinge connection relative said cart framework.

11. The assembly according to claim 10, further including an adjustable spacing bracket extending between said support framework and said cart framework for holding said support framework and said cart framework in one of a plurality of possible orientations.

12. The assembly according to claim 11, wherein said spacing bracket is connected to said support framework with a pivot connection.

13. The assembly according to claim 12, wherein said spacing bracket contains a plurality of spaced hook elements that can selectively engage said cart framework.

14. The assembly according to claim 9, wherein said flat plate tilts upwardly, when said cart framework is inclined, wherein said flat plate elevates said load plate.

15. A leverage cart, comprising:
a load support assemblage having a load plate coupled to a support framework with a hinged joint;
a hand truck assemblage having a lift arm affixed to a cart framework generally at a perpendicular, wherein said lift arm of said hand truck assemblage has a flat top plate and a distal end that extends away from said cart framework; and
a hinged connection disposed at said distal end of said lift arm, wherein said hinge connection joins said load plate to said distal end of said lift arm, wherein said hinged connection enables said load plate to remain level as said lift arm is tilted, and wherein said load plate lays flat atop said flat top plate of said lift arm when said cart framework is upright and said cart framework is vertically oriented.

16. The leverage cart according to claim 15, further including wheels connected to said cart framework.

17. The leverage cart according to claim 15, further including an adjustable spacing bracket extending between said support framework and said cart framework for holding said support framework and said cart framework in one of a plurality of possible orientations.

18. The assembly according to claim 17, wherein said spacing bracket is connected to said support framework with a pivot connection.

* * * * *